(12) United States Patent
Date

(10) Patent No.: US 8,707,753 B2
(45) Date of Patent: Apr. 29, 2014

(54) WEIGHT MEASURING DEVICE

(75) Inventor: Wataru Date, Hirakata (JP)

(73) Assignee: Omron Healthcare Co., Ltd., Kyoto-Shi (JP)

( * ) Notice: Subject to any disclaimer, the term of this patent is extended or adjusted under 35 U.S.C. 154(b) by 0 days.

(21) Appl. No.: 13/149,440

(22) Filed: May 31, 2011

(65) Prior Publication Data

US 2011/0226035 A1 Sep. 22, 2011

Related U.S. Application Data

(63) Continuation of application No. PCT/JP2009/007220, filed on Dec. 25, 2009.

(30) Foreign Application Priority Data

Dec. 26, 2008 (JP) ................. 2008-333402

(51) Int. Cl.
*G01G 23/01* (2006.01)
(52) U.S. Cl.
USPC .......................................... 73/1.13
(58) Field of Classification Search
None
See application file for complete search history.

(56) References Cited

U.S. PATENT DOCUMENTS

| | | | |
|---|---|---|---|
| 3,986,012 | A | 10/1976 | Loshbough et al. |
| 4,751,661 | A * | 6/1988 | Amacher et al. ............... 702/87 |
| 4,858,161 | A | 8/1989 | Baumann |
| 5,832,417 | A | 11/1998 | Petrucelli et al. |
| 2004/0135355 | A1 * | 7/2004 | Selig et al. ................... 280/735 |
| 2006/0288882 | A1 | 12/2006 | Moriya |
| 2007/0119226 | A1 | 5/2007 | Tellenbach et al. |
| 2008/0314648 | A1 | 12/2008 | Suzuki et al. |

FOREIGN PATENT DOCUMENTS

| | | |
|---|---|---|
| CN | 1346050 A | 4/2002 |
| CN | 1831505 A | 9/2006 |
| JP | A-2000-18582 | 1/2000 |
| JP | A-2007-330200 | 12/2007 |
| JP | A-2008-309727 | 12/2008 |

OTHER PUBLICATIONS

International Search Report dated Mar. 9, 2010 in corresponding International Application No. PCT/JP2009/007220 (with translation).
Oct. 10, 2012 Office Action issued in Chinese Patent Application No. 2009-80152624.2; with English-language translation.
Aug. 26, 2013 European Search Report issued in European Application No. 09834488.0.
Dec. 13, 2013 Russian Office Action issued in Russian Patent Application No. 2011131068/28(045807) (with English-language translation).

* cited by examiner

*Primary Examiner* — Robert R Raevis
(74) *Attorney, Agent, or Firm* — Oliff PLC

(57) ABSTRACT

To correctly recognize the 0 kg state and to reduce the time required for weight measurement. A body composition meter including a load cell for measuring a weight includes step of performing a measurement of an output value of the load cell in an initial state on which a measuring target does not ride, a storage unit for storing a plurality of measured output values of the initial state, step for creating 0 kg reference value data when variation of the plurality of output values in the initial state is within a predetermined range, and step of measuring using the initial reference value when measuring the weight with the load cell.

11 Claims, 8 Drawing Sheets

0 kg reference value data — 161

| Set year, month, day | 0 kg reference value A | 0 kg reference value B | 0 kg reference value C | 0 kg reference value D |
|---|---|---|---|---|
| yy/mm/dd | **** | **** | **** | **** |

(B)

0 kg State measurement value data — 162

| No. | Set year, month, day | 0 kg state measurement value A | 0 kg state measurement value B | 0 kg state measurement value C | 0 kg state measurement value D |
|---|---|---|---|---|---|
| 1 | yy/mm/dd | **** | **** | **** | **** |
| 2 | yy/mm/dd | **** | **** | **** | **** |
| ⋮ | | | | | |
| 10 | yy/mm/dd | **** | **** | **** | **** |

WEIGHT MEASURING DEVICE

TECHNICAL FIELD

The present invention relates to weight measuring devices for measuring weight of a living body, and in particular, to a weight measuring device capable of eliminating the measurement of 0 kg (measurement of initial state in which the user has not ridden on) using the measurement plural times.

BACKGROUND ART

Various weight measuring devices for measuring the weight of the living body have been conventionally proposed. The proposed device for measuring the weight includes a device in which the function of the weight scale is provided to the body composition meter, where a device for measuring the weight of a pet is proposed as a device defining a reference value through calibration beforehand (see patent document 1). Such pet automatic weight measurement system is described to use the reference value obtained through calibration using a spindle of a predetermined weight in advance.

The 0 kg state that becomes the reference value changes by the installed location, the tilt, and the like of the weight measuring device. The pet automatic weight measurement system described above obtains the reference value through calibration in advance, and thus has error caused by the installing environment after factory shipment.

Measurement of 0 kg is generally carried out before starting the weight measurement to ensure the precision for the weight measuring device. In this case, however, the measurement takes time and the measurement cannot be started right away. Thus, the problem in that each measurement takes time arises.

Patent Document 1: Japanese Unexamined Patent Publication No. 2007-330200

DISCLOSURE OF THE INVENTION

Problems to be Solved by the Invention

In light of the foregoing, it is an object of the present invention to correctly recognize the state of 0 kg, and reduce the time required for the weight measurement.

Means for Solving the Problem

The present invention relates to a weight measuring device including weight measuring means for measuring weight or a weight measuring method, the weight measuring device or the weight measuring method including initial value measuring means for carrying out measurement of an output value of the weight measuring means in an initial state on which a measuring target does not ride; storage means for storing a plurality of measured initial values; initial reference value creating means for creating an initial reference value when variation of the plurality of initial values is within a predetermined range; and initial reference value application means for measuring using the initial reference value when measuring the weight of the measuring target with the weight measuring means; wherein the initial reference value creating means stores the created initial reference value in the storage means; and the initial reference value application means has a configuration adapted to measure the weight of the measuring target using the initial reference value when the initial reference value is stored in the storage means and includes a measurement initial value application means for measuring the weight of the measuring target using the initial value measured with the initial value measuring means when the initial reference value is not stored in the storage means.

The initial value may be an output value of the initial weight measuring means.

An accurate weight measurement can be realized in a short time.

Further, in one aspect of the present invention, the initial reference value creating means stores the created initial reference value in the storage means; and the initial reference value application means has a configuration adapted to measure the weight of the measuring target using the initial reference value if the initial reference value is stored in the storage means and includes measurement initial value application means for measuring the weight of the measuring target using the initial value measured with the initial value measuring means when the initial reference value is not stored in the storage means.

The initial value is measured each time and an accurate weight measurement using the relevant initial value is executed until the initial reference value is created, and the weight measurement is accurately executed in a short time using the initial reference value after the initial reference value is created.

Another aspect of the present invention includes update necessity determining means for determining necessity to update the initial reference value is further arranged; and initial reference value disusing means for disusing the initial reference value stored in the storage means when determined that the update is necessary by the update necessity determining means.

The initial reference value disusing means is configured by appropriate means such as a means for erasing the initial reference value stored in the storage means, a means for changing the operation to carry out the process without using the initial reference value stored in the storage means, and the like.

According to such aspect, the initial reference value can be reliably updated when the update of the initial reference value is necessary.

In another aspect of the present invention, the storage means has a configuration adapted to store an output value of the weight measuring means after the weight measurement of each time as a measured value; and the update necessity determining means has a configuration adapted to determine the initial value before the start of the weight measurement, and compare the initial value and the most recent measured value read from the storage means to determine that update is necessary when a predetermined change exists and determine that update is not necessary otherwise.

The predetermined change can be defined as an appropriate change such as a change of the strain value of greater than or equal to a constant amount.

According to such an aspect, the initial reference value can be updated if the state of the weight measuring means is changed from the previous measurement. Therefore, the old initial reference value can be prevented from being continuously used even when the situation is changed.

In the present invention, timing means for measuring elapse of time is arranged; wherein the update necessity determining means has a configuration adapted to determine that update is necessary when a predetermined time has elapsed from the creation of the initial reference value by the initial reference value creating means, and determine that update is not necessary otherwise.

Therefore, the initial reference value can be updated every predetermined time, and the most recent initial reference value can always be obtained. Thus, even if the initial state of the weight measuring means changes by change over the years, or the like, the initial reference value can be updated to the initial reference value corresponding to such a change.

In another further aspect of the present invention, the update necessity determining means has a configuration adapted to determine that update is necessary when fluctuation exists in the output value of the weight measuring means when the weight measurement of the measuring target is not being carried out, and determine that update is not necessary otherwise.

Therefore, the output of the weight measuring means by factors other than a weight measurement such as movement and vibration may be detected, and the initial reference value can be updated.

In another further aspect of the present invention, acceleration detection means for detecting a change in acceleration by movement or vibration is further arranged; wherein the update necessity determining means has a configuration adapted to determine that update is necessary when the change in acceleration is detected by the acceleration detection means, and determine that update is not necessary otherwise.

Therefore, an environmental change that influences the measurement accuracy such as movement and vibration may be detected, and the initial reference value can be updated.

In another further aspect of the present invention, display means for displaying whether the weight is measured using the initial value measured with the initial value measuring means, or whether the weight is measured using the initial reference value stored in the storage means is further arranged.

Therefore, whether the initial value measured immediately before the weight measurement is used or the initial reference value stored in the storage means is used can be checked.

Effect of the Invention

According to the present invention, the state of 0 kg can be correctly recognized, and the time required for the weight measurement can be reduced.

BRIEF DESCRIPTION OF THE DRAWINGS

FIGS. 6A and 6B are explanatory views of data stored in the storage unit of the body composition meter of the second example.

BEST MODE FOR CARRYING OUT THE INVENTION

One embodiment of the present invention will be described below with the drawings.

First Example

Figure 1:
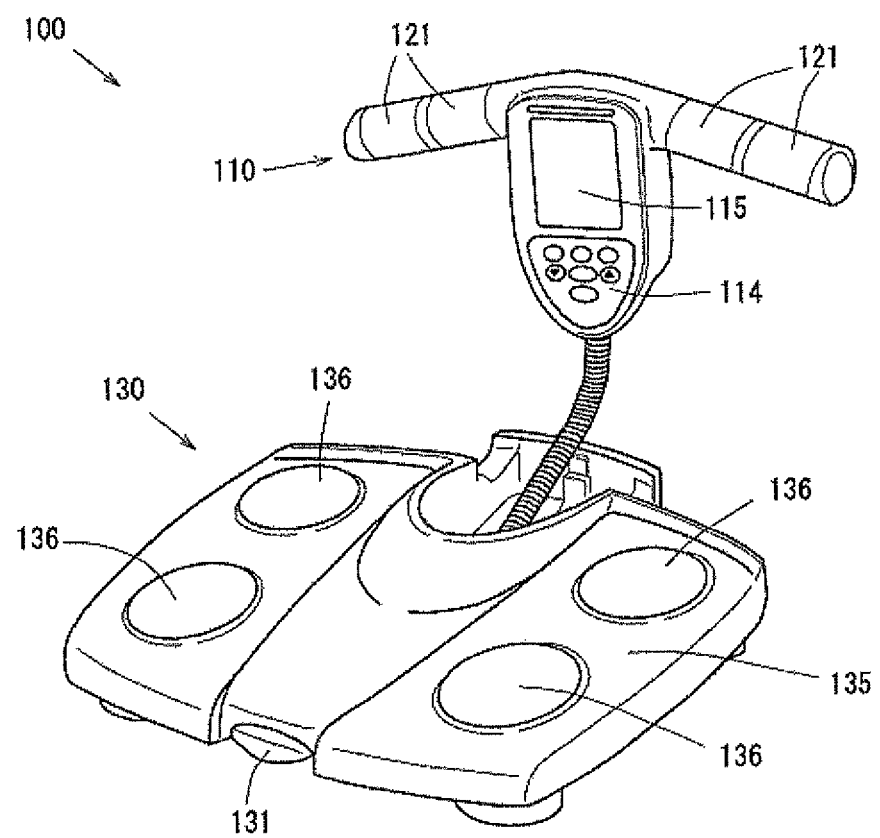
FIG. 1 is a perspective view showing an outer appearance of a body composition meter.
Figure 2:
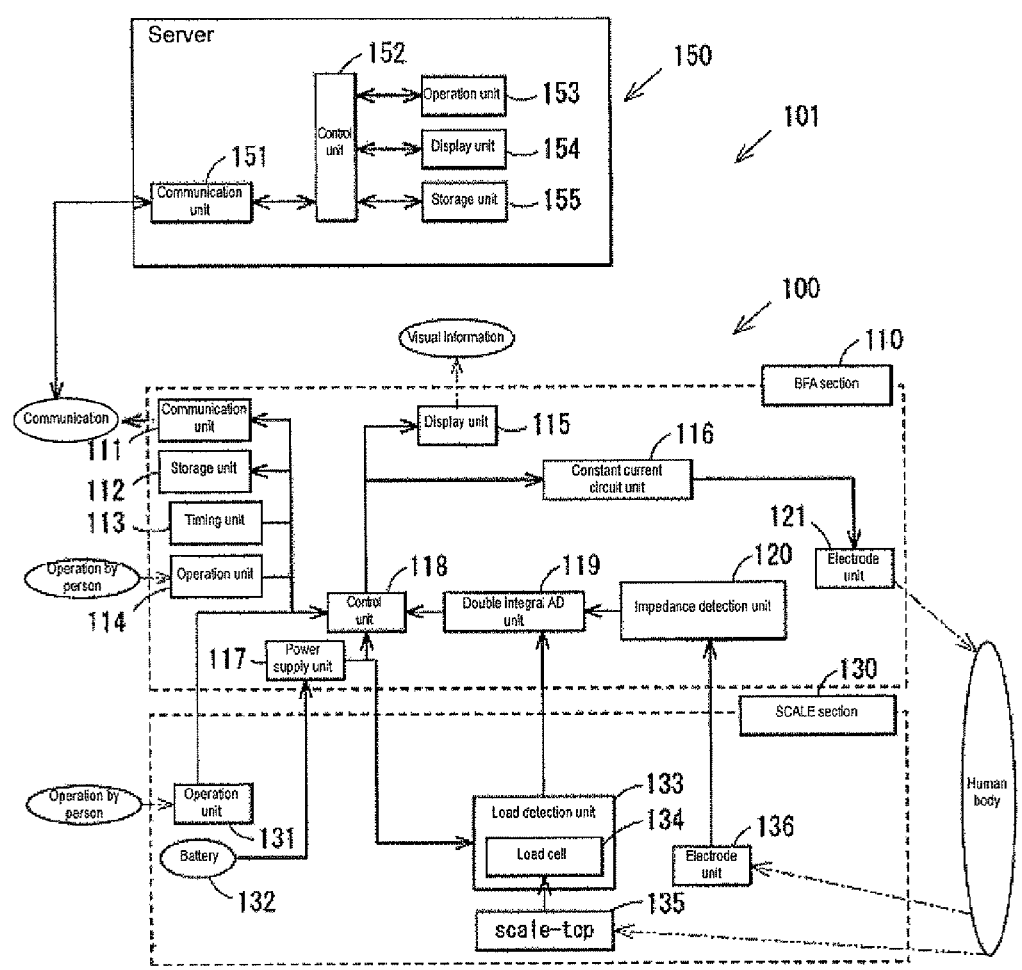
FIG. 2 is a block diagram showing a configuration of the body composition meter and a server.

FIG. 1 is a perspective view showing an outer appearance of a body composition meter 100 having the function of a weight scale, and FIG. 2 is a block diagram showing a configuration of the body composition meter 100 and a server 150 communicable with the body composition meter 100. In the illustration of FIG. 2, one body composition meter 100 is connected to the server 150, but a plurality of different types of body composition meters 100 or biological information acquiring devices such as a pedometer or an activity amount meter may be connected to the server 150.

As shown in FIG. 1, the body composition meter 100 is mainly configured by a display operation section 110 (BFA section: body fat analyzer section) serving as a first housing to be gripped by the user with hands, and a weight measurement section 130 (SCALE section) serving as a second housing on which the user rides.

As shown in FIG. 2, the display operation section 110 includes a communication unit 111, a storage unit 112, a timing unit 113, an operation unit 114, a display unit 115, a constant current circuit unit 116, a power supply unit 117, a control unit 118, a double integral AD unit 119, an impedance detection unit 120, and an electrode unit 121.

The communication unit 111 is connected to the control unit 118, and carries out communication with the server 150 according to a control signal of the control unit 118. The communication unit 111 may be configured to communicate not only with the server 150 but with an appropriate device such as to communicate with other biological information acquiring devices such as a pedometer or to communicate with a personal computer or a portable information terminal (PDA, portable telephone, etc.).

The storage unit 112 is configured by a device capable of storing information such as a non-volatile memory or a hard disc, and carries our read and write of information according to a control signal of the control unit 118 to which it is connected. The storage unit 112 stores past 0 kg state measurement values and 0 kg reference values.

The timing unit 113 (timing means) is a device for timing time such as current date and time, and sends the time to the control unit 118 as necessary.

The operation unit 114 is configured by a plurality of buttons (see FIG. 1) to be push operated, and sends the input information push operated by the user such as input of user information including weight and height to the control unit 118.

The display unit 115 is configured by a display device such as a liquid crystal screen (see FIG. 1), and displays images such as characters and figures according to an image signal transmitted from the control unit 118.

The constant current circuit unit 116 flows high frequency (alternating) current supplied from the power supply unit 117 in one direction to the electrode unit 121 for current application based on the control of the control unit 118.

The power supply unit 117 supplies operation power to each unit including the control unit 118.

The control unit 118 is configured by a CPU, a ROM, a RAM or a micro-computer, and executes the control operation and the calculation operation of each unit according to a program stored in the ROM or the like.

The double integral AD unit 119 is a double integral type AD (Analog/Digital) converter, and converts an analog signal provided from the impedance detection unit 120 to a digital signal.

The impedance detection unit 120 detects an impedance based on a potential difference between an electrode unit 136 arranged in the weight measurement section 130 and the electrode unit 121 arranged in the display operation section 110.

The electrode unit 121 is arranged on a surface of a grip portion (see FIG. 1) of the display operation section 110 to be held by the user with hands, and applies a high frequency (alternating) current supplied from the power supply unit 117 to the palm of the user who is gripping the grip portion.

The weight measurement section 130 is configured by an operation unit 131, a battery 132, a load detection unit 133, and the electrode unit 136.

The operation unit 131 functions as an input switch for switching ON/OFF of the power supply, and transmits an inputted input signal to the control unit 118.

The battery 132 carries out power supply to each unit centering on the power supply unit 117.

The load detection unit 133 incorporates a load cell 134, and measures the weight of the user who got on an upper surface cover unit 135 (see FIG. 1) also serving as an upper surface cover of the housing. The weight measured here is sent to the double integral AD unit 119. The load cell 134 adopts a strain gauge type detection method, where a strain gauge is attached to an elastic body called a flexure element, and a strain value of such strain gauge is output. The proportional relation between such strain value and stress (force by weight) is used to measure the weight.

The electrode unit 136 is an electrode for current measurement that is arranged on the surface of an upper surface portion (see FIG. 1) of the weight measurement section 130 on which the user goes no, and that receives the current flowing from the back of the feet of the user. The electrode unit 136 is configured by four electrodes on the left toe side, left heel side, right toe side and right heel side of the user.

The server 150 is configured by a communication unit 151, a control unit 152, an operation unit 153, a display unit 154, and a storage unit 155.

The communication unit 151 carries out transmission and reception of data with the body composition meter 100 according to the control of the control unit 152.

The control unit 152 is configured by a CPU, a ROM, and a RAM, and executes the control operation and the calculation operation of each unit according to a program stored in the ROM or the like.

The operation unit 153 is configured by an operation input device such as a keyboard or a mouse, and transmits an input signal input by operation to the control unit 152.

The display unit 154 is configured by a display device such as a liquid crystal display or a CRT display, and carries out displaying according to a control signal of the control unit 152.

The storage unit 155 is configured by a storage device such as a hard disc in which various data related to the living body such as body composition data (body fat data and weight data) measured with the body composition meter 100, the number of step data measured with a pedometer (not shown), the activity amount data measured with an activity amount meter (not shown), and personal information including name and address of the user are stored.

A biological information acquiring system 101 is configured by the body composition meter 100 configured as above, the server 150, and other biological information acquiring devices such as the pedometer or the activity amount meter (not shown). The other biological information acquiring device such as the pedometer and the activity amount meter (not shown) data communicates with the server 150 through the communication unit 151 and stores appropriate data such as number of steps, walking waveform, and activity amount in the storage unit 155 of the server 150. A great number of types of biological information thus can be handled.

Figure 3:
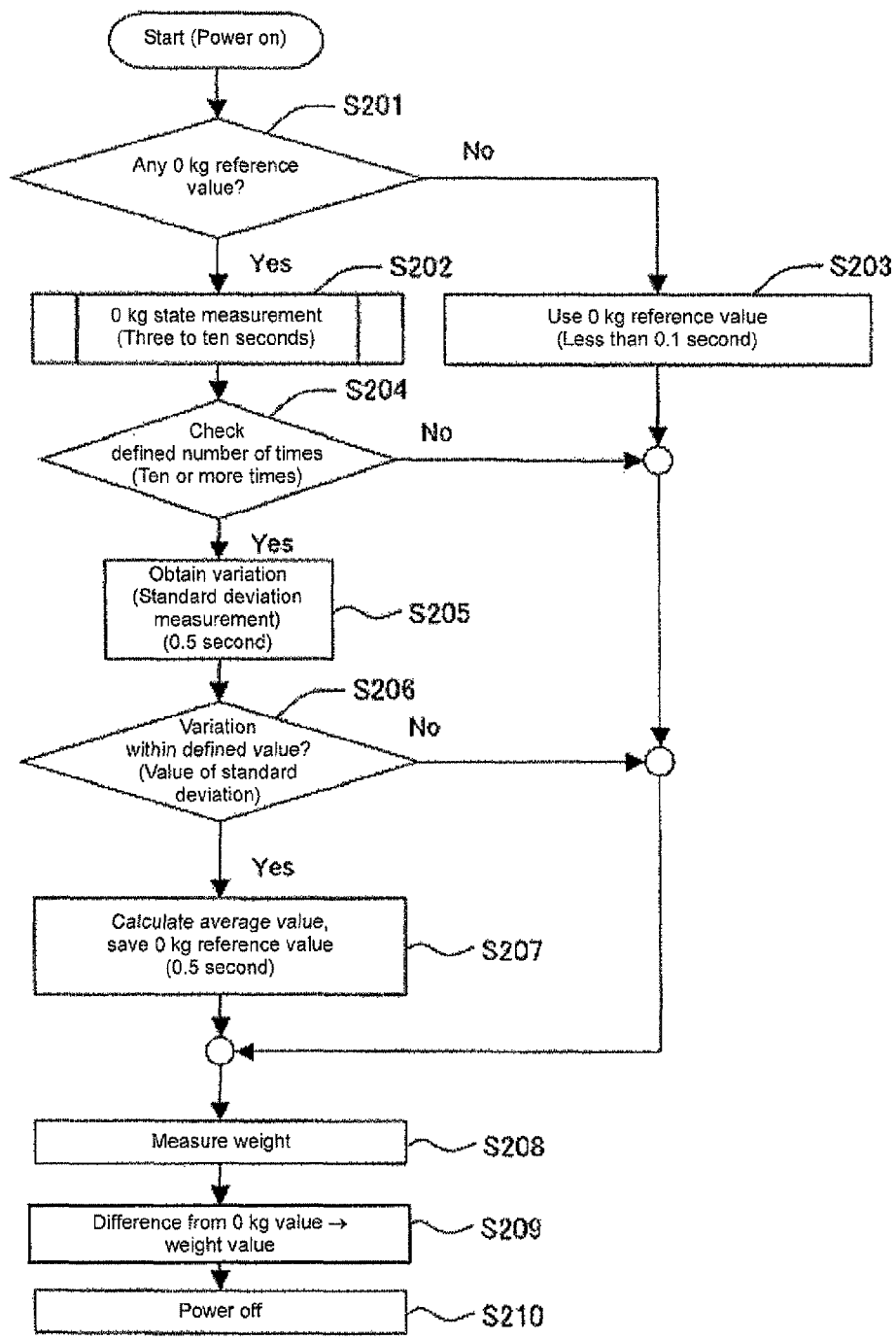
FIG. 3 is a flowchart showing an operation of measuring weight using a 0 kg reference value.

FIG. 3 is a flowchart showing the operation in which the control unit 118 of the body composition meter 100 measures weight using the 0 kg reference value.

The control unit 118 determines whether or not the 0 kg reference value is stored in the storage unit 112 (step S201), and uses such 0 kg reference value as the weight measurement 0 kg value (step S203) when the 0 kg reference value is stored (step S201: No), and proceeds the process to step S208. In this case, the time required until setting the 0 kg reference value to use is a very short time of less than 0.1 second.

When the 0 kg reference value is not stored in the storage unit 112 (step S201: Yes), the control unit 118 acquires the 0 kg state measurement value by executing a 0 kg state measurement process by means of the load detection unit 133 (step S202). The details of the 0 kg state measurement process will be described later, where the time of a certain extent such as three to ten seconds is necessary until the completion of the measurement.

When terminating the 0 kg state measurement and acquiring the 0 kg state measurement value, the control unit 118 determines whether or not the 0 kg measurement of a defined number of times (e.g., ten times) or more including the 0 kg state measurement value accumulated in the storage unit 112 in the past is carried out (step S204).

When less than the defined number of times (step S204: No), the control unit 118 uses the 0 kg state measurement value obtained in step S202 as the weight measurement 0 kg value, and proceeds the process to step S208.

When greater than or equal to the defined number of times (step S204: Yes), the control unit 118 executes a standard deviation measurement (step S205). The standard deviation measurement is a process for obtaining the variation of the accumulated 0 kg state measurement value including the 0 kg state measurement value acquired in step S202, where the standard deviation of such variation is obtained. The calculation for obtaining the variation takes about 0.5 seconds.

When the variation is not within a defined value (step S206: No), the control unit 118 uses the 0 kg state measurement value obtained in step S202 as the weight measurement 0 kg value, and proceeds the process to step S208.

When the variation is within the defined value (step S206: Yes), the control unit 118 calculates an average value of the accumulated 0 kg state measurement value including the 0 kg state measurement value acquired in step S202, and saves such average value in the storage unit 112 as the 0 kg reference value (step S207). Such calculation and saving require about 0.5 second. In this case, the control unit 118 sets either the 0 kg state measurement value acquired in step S202 or the 0 kg reference value calculated in step S207 for the weight measurement 0 kg value. Which value to use for the weight measurement 0 kg value may be set in advance.

The control unit 118 carries out a weight measurement for acquiring the output value output by the load detection unit 133 with the user on the upper surface cover unit 135 (step S208).

The control unit 118 then takes the difference with the weight measurement 0 kg value for the output value acquired in step S208, outputs such difference as the weight value (step S209), and turns OFF the power supply (step S210) to terminate. This output may be executed through an appropriate method such as displaying on the display unit 115, storing in the storage unit 112, and transmitting to the server 150.

Figure 4:
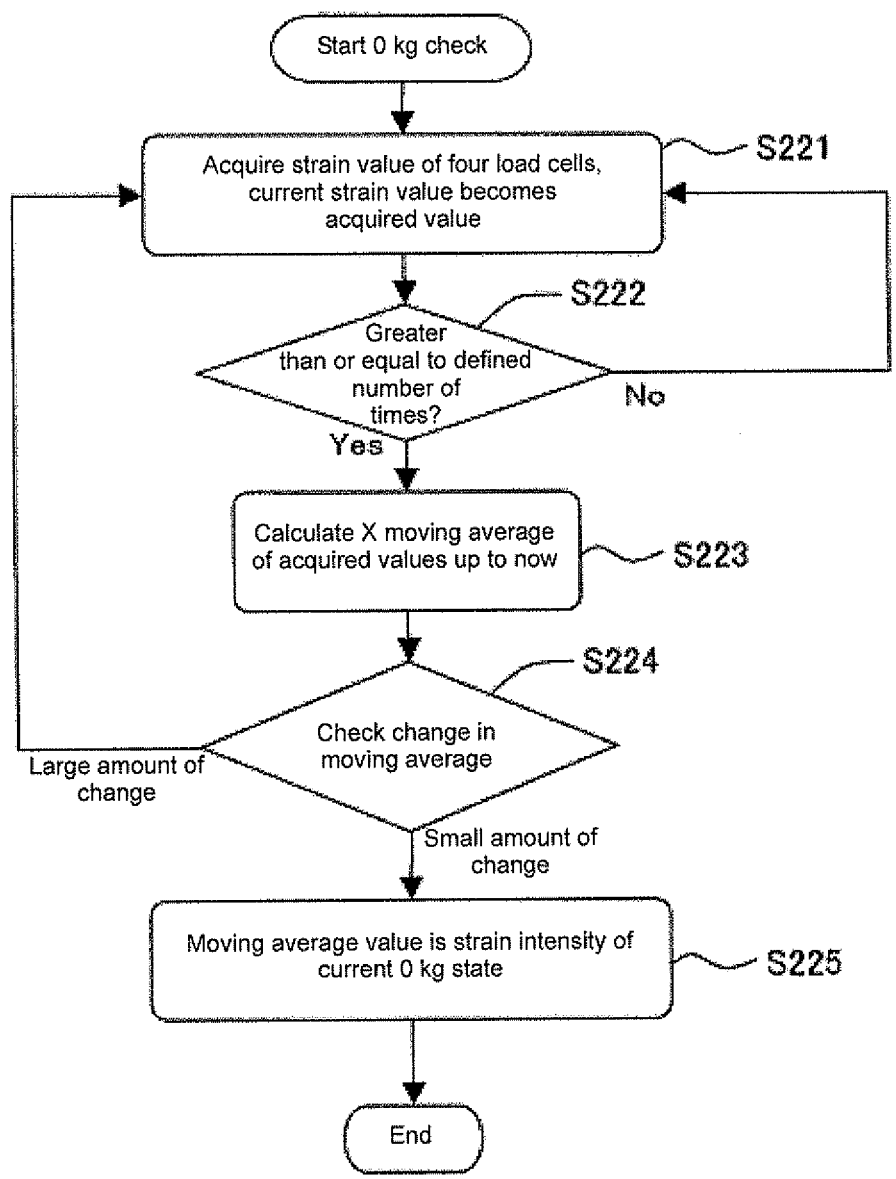
FIG. 4 is a flowchart of a detailed operation of a 0 kg state measurement process.

FIG. 4 is a flowchart showing a detailed operation of the 0 kg state measurement process of step S202 described above.

The control unit 118 acquires a strain value of four load cells 134 (see FIG. 2) arranged in the load detection unit 133 (step S221). With such strain value, the current strain value becomes the acquired value.

The control unit 118 checks whether or not the acquired number of times of the strain value is greater than or equal to a defined number of times (step S222). When less than the defined number of times (step S222: No), the process is returned to step S221 to again execute the acquisition of the strain value.

When greater than or equal to the defined number of times (step S222: Yes), the control unit 118 calculates the moving average (X moving average) of the acquired values up to now and obtains the moving average value (step S223).

The control unit 118 checks the change in the moving average value, and returns the process to step S221 to again execute the acquisition of the strain value if the amount of change is large (step S224: large amount of change).

If the amount of change of the moving average value is small (step S224: small amount of change), the control unit 118 determines that such moving average value is the strain intensity of the current 0 kg state (step S225), and terminates the process.

The measurement of the body fat percentage by the body composition meter 100 can be carried out by executing a predetermined calculation equation based on the impedance measured by the impedance detection unit 120.

As described above, the body composition meter 100 includes initial value measuring means (control unit 118 that executes step S202) for carrying out the measurement of the output value in the initial state (0 kg state) on which the user does not ride, storage means (storage unit 112) for storing a plurality of measured initial values, initial reference value creating means (control unit 118 that executes step S207) for creating an initial reference value when variation of the plurality of initial values is within a predetermined range (within defined value), and initial reference value application means (control unit 118 that executes step S209) for measuring using the initial reference value when measuring weight by means of the weight measuring means (load detection unit 133), and hence an accurate weight measurement can be realized in a short time.

In other words, when the 0 kg state is always measured before starting the weight measurement, a time of about three to ten seconds is required each time and the measurement cannot be started right away. If the 0 kg measurement is carried out each time for about ten times from the start of measurement, and the 0 kg state of the body composition meter is saved and the average value is set as the 0 kg reference value when the variation is low, the body measurement can be carried out with the time required for the subsequent 0 kg measurement being reduced. Therefore, the measurement time can be shortened using the fact that the 0 kg state of the body composition meter 100 barely changes once the body composition meter 100 is placed at the measurement location.

Furthermore, the 0 kg state measurement value of the next time can be predicted and the time required for the measurement of the 0 kg state can be omitted by accumulating the 0 kg state measurement value in the storage unit 112 and the server 150.

Second Example

A second example for resetting the 0 kg reference value, as necessary, will be described.

Figure 5:
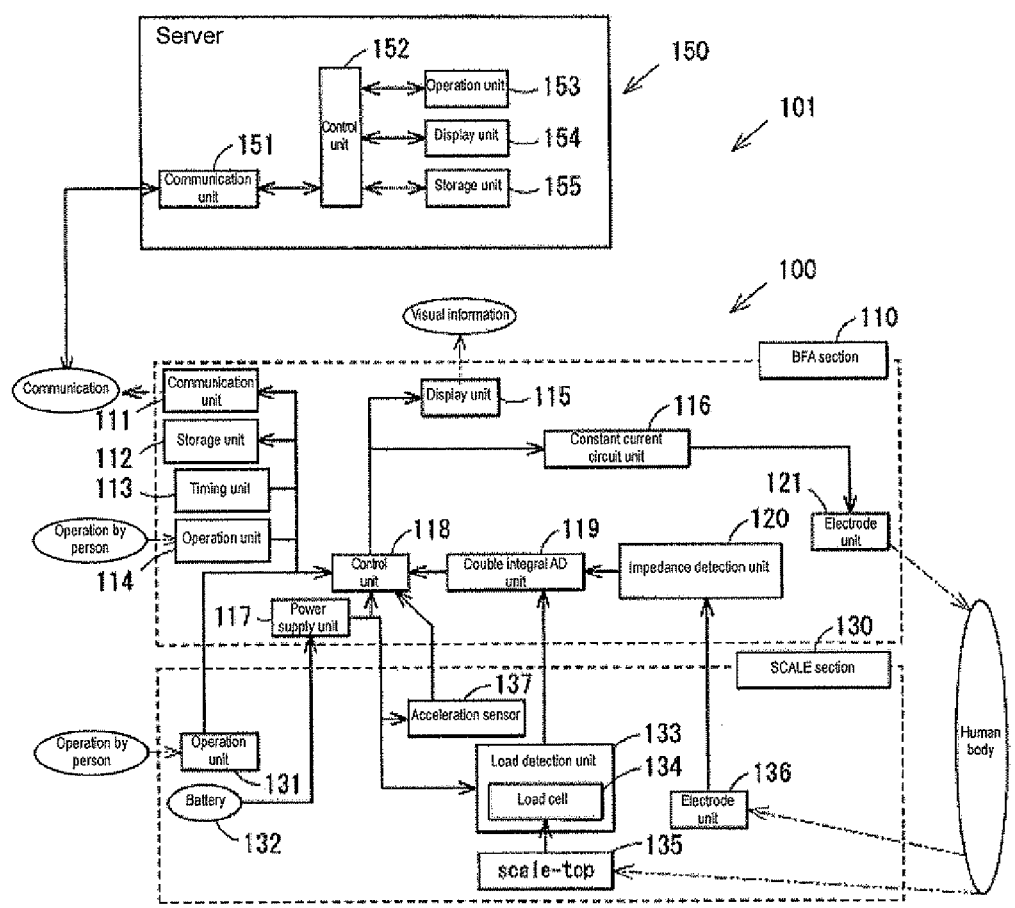
FIG. 5 is a block diagram showing a configuration of a body composition meter of a second example.

FIG. 5 is a block diagram showing a configuration of a body composition meter 100A. The body composition meter 100A includes an acceleration sensor 137 in a weight measurement section 130A. The acceleration sensor 137 detects a change in acceleration caused by a movement or vibration, and transmits the detected acceleration signal to the control unit 118. An appropriate acceleration sensor may be used for the acceleration sensor, but a three-dimensional acceleration sensor is preferable in order to detect the movement and the vibration in all directions.

Other configurations are the same as the first example, and thus the same reference numerals are denoted for the same elements and the detailed description thereof will be omitted.

FIGS. 6A and 6B are explanatory views of data stored in the storage unit 112 of the body composition meter 100A, where FIG. 6A shows 0 kg reference value data 161 and FIG. 6B shows 0 kg state measurement value data 162.

As shown in FIG. 6A, the 0 kg reference value data 161 stores set year, month and day acquired from the timing unit 113 at the time of setting and 0 kg reference values A to D determined for the four load cells 134. The 0 kg reference value data 161 is configured as data of one record for storing only one data for each item.

As shown in FIG. 6B, the 0 kg state measurement value data 162 stores set year, month and day acquired from the timing unit 113 at the time of measurement and 0 kg reference values A to D determined for the four load cells 134. The 0 kg state measurement value data 162 stores the strain value of the four load cells 134 measured in step S221 described in the first example along with the measurement year, month, and day, and is configured to store for a plurality of times (for ten times in the example). The data is stored in order from the first record, and returned to the first record and overwritten after the data is stored up to the last record. A plurality of most recent data thus can be stored.

Figure 7:
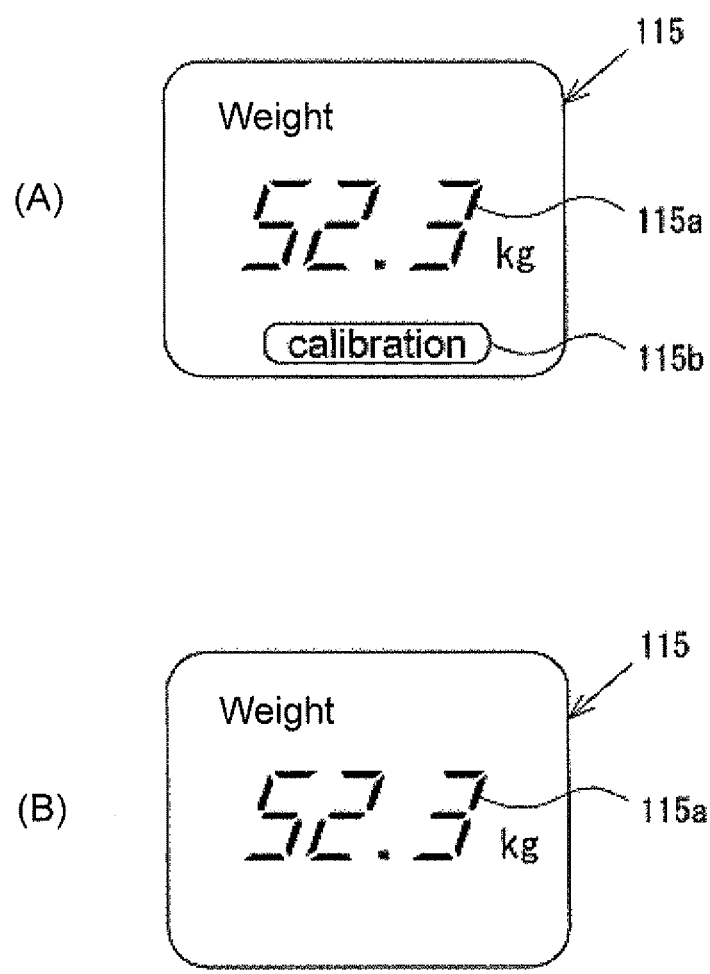
FIGS. 7A and 7B are explanatory views describing display content to be displayed on the display unit of the body composition meter of the second example.

FIGS. 7A and 7B are explanatory views describing the display content to be displayed on the display unit 115 of the body composition meter 100A. As shown in FIG. 7A, the display unit 115 includes a weight display portion 115a for displaying the measured weight, and a calibration display portion 115b showing the weight in which the 0 kg state is measured immediately before and such 0 kg state measurement value is used.

If the 0 kg reference value is not present in step S201 of the first example (step S201: Yes), a display "calibration" is made on the calibration display portion 115b as shown in FIG. 7A. If the 0 kg reference value is present in step S201 of the first example (step S201: No), display is not made on the calibration display portion 115b and the weight is displayed on the weight display portion 115a, as shown in FIG. 7B.

The display of the calibration display portion 115b is not limited to displaying "calibration" as shown in the drawing, and appropriate displays such as providing other sentences such as "adjustment right before" or displaying appropriately defined figures may be carried out.

Figure 8:
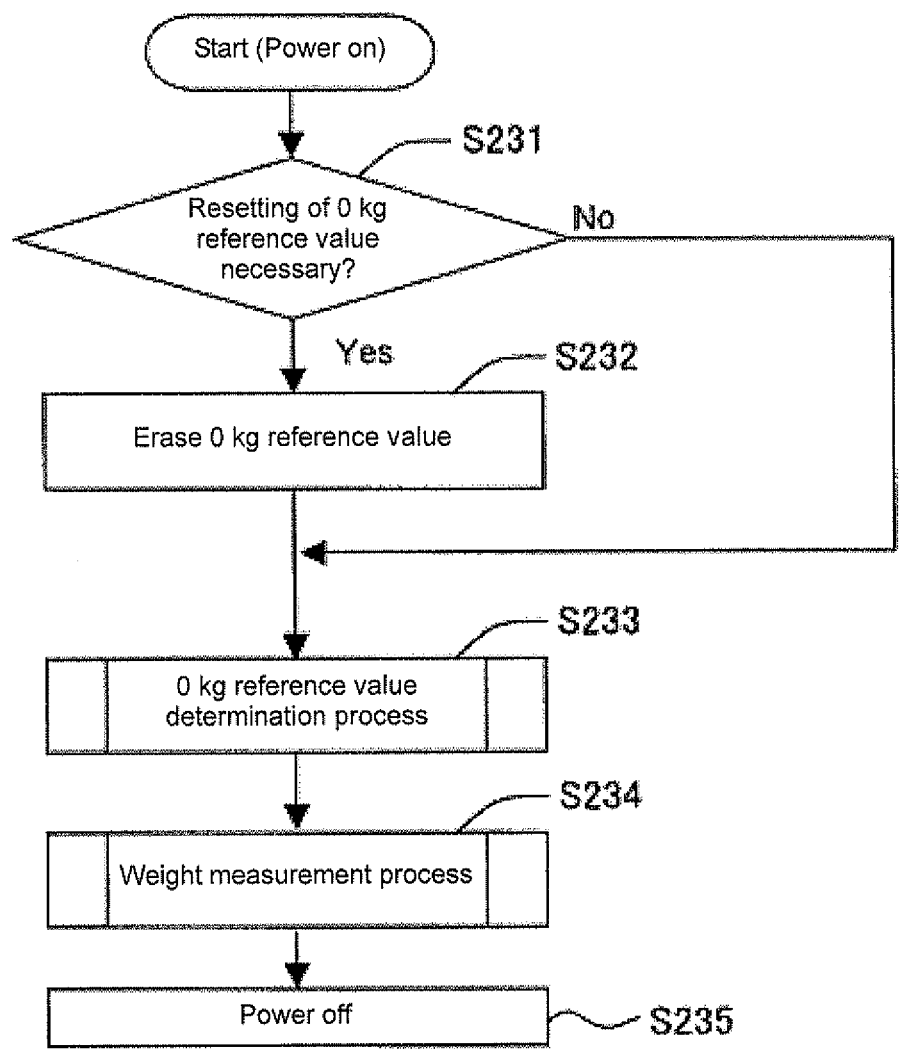
FIG. 8 is a flowchart of an operation executed by a control unit of the body composition meter of the second example.

FIG. 8 is a flowchart showing the operation in which the control unit 118 of the body composition meter 100A resets the 0 kg reference value as necessary and uses the 0 kg reference value to carry out a weight measurement.

When the power supply is turned ON, the control unit 118 determines whether or not the resetting of the 0 kg reference value is necessary (step S231), This determination is made based on whether or not a predetermined condition is met. Specifically, determination may be made that the resetting is necessary when the current date has elapsed a predetermined number of days or more from the set year, month and day stored in the 0 kg reference value data 161 of the storage unit 112, and determination may be made that the resetting is not necessary otherwise.

In addition, the 0 kg state measurement values of the four load cells 134 may be measured, the 0 kg state measurement values A to D (in this case, 0 kg state measurement value measured after the end of the weight measurement is preferable) of the most recent load cell 134 in the past is acquired from the 0 kg state measurement value data 162 of the storage unit 112, and these may be compared so that the determination is made that the resetting is necessary when there is a change of a predetermined amount or more.

The determination may be made that the resetting is necessary when the change in acceleration of a predetermined amount or more is detected by the acceleration sensor 137 after the measurement of the previous time. In this case, when a change in acceleration of a predetermined amount or more is detected by the acceleration sensor 137, the amount of change in acceleration and the changed year, month, day may be stored in the storage unit 112. If the detection of the change in acceleration is newer than the most recent measurement in the past, determination may be made that the resetting is necessary assuming that there is a change in acceleration due to movement, or the like.

The determination may be made that the resetting is necessary if at least one criterion is met using a plurality of criteria such as number of days, 0 kg state, or a change in acceleration as a predetermined reference.

When determined that the resetting is necessary in such manner (step S231: Yes), the control unit 118 may erase the 0 kg reference value data 161 of the storage unit 112 (step S232), and execute the 0 kg reference value determination process (step S233). In this case, the 0 kg state measurement value data 162 may also be erased.

If determined that the resetting is unnecessary (step S231: No), the control unit 118 executes the 0 kg reference value determination process (step S233).

The 0 kg reference value determination process performs the same processes as steps S201 to S207 of the first example described above, and the detailed description thereof will be omitted. Therefore, the 0 kg state measurement of step S202 is executed when determined that the resetting is necessary in step S231, and the 0 kg reference value is used in step S203 when determined that the resetting is not necessary in step S231.

The control unit 118 executes the weight measurement process (step S234). The weight measurement process performs the same process as steps S208 to S209 of the first example described above, and the detailed description will be omitted. In step S209, whether or not the calibration (adjustment of 0 kg reference value) is carried out immediately before as shown in FIG. 7A (calibration display portion 115b) is also simultaneously displayed when displaying the measured weight on the display unit 115.

The control unit 118 determines whether or not the resetting of the 0 kg reference value is necessary in such manner, determines the 0 kg reference value, and turns OFF the power supply after performing the weight measurement to terminate the process (step S235).

According to the configuration and the operation described above, detection can be made that the resetting is required and the 0 kg reference value can be set when the resetting of the 0 kg state is required such as when the body composition meter 100A is moved.

As the respective strain values (value of strain gauge) measured with the four load cells 134 are stored as 0 kg state measurement values A to D, the tilt of the bottom surface can be determined by comparing such values. In other words, only the own weight of the body composition meter 100A is applied on the strain gauge when the person does not ride on, and hence the tilt of the bottom surface can be determined by comparing the same. The error in a weight measurement due to the tilt of the bottom surface thus can be prevented.

The enhancement of the measurement accuracy and the reduction of the measurement time can both be achieved in accordance with the usage mode of the weight scale (body composition meter 100A) which is often arranged in the same place once it is arranged.

In other words, when installed at some place, the 0 kg state measurement is executed each time at first, and then the highly accurate weight measurement can be carried out although it takes some time. When the 0 kg state measurement value of a predetermined number of times such as ten times is accumulated, the average value is saved as the 0 kg reference value, and such 0 kg reference value is subsequently used to complete the weight measurement in a short period of time. In this case, the values saved as the 0 kg reference value are limited to those which variation is within the defined value, and thus high accuracy can be maintained.

When corresponding to the resetting criterion such as when the weight scale (body composition meter 100A) is moved and the 0 kg state is changed, the 0 kg reference value is erased (reset) and the measurement of the 0 kg state and the setting of the 0 kg reference value are carried out from the beginning.

The 0 kg reference value is thereby adjusted to the most suitable state in situ every time the weight scale (body composition meter 100A) is moved or the like, so that the user can know the highly accurate weight by simply installing the weigh scale (body composition meter 100A) and measuring the weight without performing a complicated operation.

The resetting of the 0 kg reference value is executed even if the measurement value of the 0 kg state is changed when the weight scale (body composition meter 100A) is rearranged in situ or when the weight scale hits an object and the tilt thereof is changed, and thus a highly accurate weight measurement can be executed in the most suitable state on a constant basis.

Furthermore, the resetting of the 0 kg reference value is executed when a predetermined time has elapsed, and thus readjustment is carried out to enable an accurate measurement even if a change occurs in the 0 kg state due to a secular change or the like.

Effects same as the first example are also obtained.

The 0 kg measurement is executed before the weight measurement in each example described above, but this is not the sole case, and a configuration of executing the 0 kg measurement after the weight measurement or a configuration of executing the 0 kg measurement before and after the weight measurement may be adopted. In particular, when executing the 0 kg state measurement before and after the weight measurement, an average value of the 0 kg state measurement values measured before and after the weight measurement may be used or an error display may be made on the display unit 115 to urge remeasurement when there is a different in strain value of the 0 kg state measured before and after the weight measurement, thereby further enhancing the accuracy.

The time stored in the 0 kg reference value data 161 and the 0 kg state measurement value data 162 is year, month, and day, but it is not limited thereto, and any appropriate unit that can determine the elapse of time such as date and time may be adopted.

In the correspondence of the configuration of the present invention and the embodiment described above, a weight measuring device of the present invention corresponds to the body composition meters 100, 100A of the embodiment; and similarly, storage means corresponds to the storage unit 112;
timing means corresponds to the timing unit 113;
display means corresponds to the display unit 115;
initial reference value application means corresponds to the control unit 118 that executes step S203;
measurement initial value application means corresponds to the control unit 118 that executes step S204: NO and step S206: NO;
initial reference value creating means corresponds to the control unit 118 that executes step S207;
initial value measuring means corresponds to the control unit 118 that executes step S221;
update necessity determining means corresponds to the control unit 118 that executes step S231;
initial reference value disusing means corresponds to the control unit 118 that executes step S232;
weight measuring means corresponds to the load cell 134;
acceleration detection means corresponds to the acceleration sensor 137;
an initial reference value corresponds to 0 kg reference values A to D of the 0 kg reference value data 161;
an initial value corresponds to the 0 kg state measurement value;
a predetermined time corresponds to a predetermined number of days;
output value of the weight measuring means corresponds to a strain value;
a measuring target corresponds to the user;
a predetermined change corresponds to change of a predetermined amount or more;
a predetermined range corresponds to the defined value; and
an initial state corresponds to the state in which the user does not ride on; but
the present invention is not limited only to the configuration of the above-described embodiment, and a great number of embodiments can be obtained.

INDUSTRIAL APPLICABILITY

The present invention can be used in various fields where weight measurement is carried out such as being used in a device for measuring the weight of a living body including a weight scale for measuring the weight of a human or an animal weight scale for measuring the weight of an animal, or being used in a device for measuring the weight of an article.

DESCRIPTION OF SYMBOLS

100, 100A body composition meter
112 storage unit
113 timing unit
115 display unit
118 control unit
134 load cell
137 acceleration sensor
161 0 kg reference value data

The invention claimed is:

1. A weight measuring device including a weight measuring unit that measures weight; the weight measuring device comprising:
a control unit that carries out a measurement of initial values of the weight measuring unit in an initial state on which a measuring target does not ride;
a storage unit that stores a plurality of measured initial values;
the control unit creates an initial reference value when variation of the plurality of initial values is within a predetermined range and measures using the initial reference value when measuring the weight of the measuring target with the weight measuring unit; wherein the control unit stores the created initial reference value in the storage unit and the control unit is adapted to measure the weight of the measuring target using the initial reference value when the initial reference value is stored in the storage unit and is adapted to measure the weight of the measuring target using the initial values measured with the control unit when the initial reference value is not stored in the storage unit.

2. The weight measuring device according to claim 1, wherein the control unit is configured to determine whether there is a necessity to update the initial reference value and not use the initial reference value stored in the storage unit when it determines that the update is necessary.

3. The weight measuring device according to claim 2, wherein the storage unit is adapted to store an output value of the weight measuring unit after the weight measurement of each time as a measured value and the control unit is adapted to determine the initial value before the start of the weight measurement, and compare the initial value and the most recent measured value read from the storage unit to determine that the update is necessary when a predetermined change exists and determine that update is not necessary otherwise.

4. The weight measuring device according to claim 2, further comprising:
a timing unit that measures elapse of time; wherein
the control unit is adapted to determine that update is necessary when a predetermined time has elapsed from the creation of the initial reference value and determine that update is not necessary otherwise.

5. The weight measuring device according to claim 2, wherein the control unit is adapted to determine that update is necessary if fluctuation exists in the input values of the weight measuring unit when the weight measurement of the measuring target is not being carried out, and determine that update is not necessary otherwise.

6. The weight measuring device according to claim 2, further comprising:
an acceleration detection unit that detects a change in acceleration by movement or vibration; wherein
the control unit is adapted to determine that update is necessary when the change in acceleration is detected by the acceleration detection unit, and determine that update is not necessary otherwise.

7. The weight measuring device according to claim 1, further comprising a display unit that displays whether the weight is measured using the initial value measured with the control unit, or whether the weight is measured using the initial reference value stored in the storage unit.

8. A weight measuring device comprising:
a weight measuring unit configured to measure weight;
a storage unit; and
a control unit adapted to:
(i) effectuate a measurement of an initial value of an initial state of the weight measuring unit without a measuring target thereon when an initial reference value is not stored in the storage unit and, each time, effectuate storage of the initial value in the storage unit to obtain a plurality of initial values;
(ii) create the initial reference value when variation of a predetermined number of initial values is within a predetermined range and effectuate storage of the initial reference value in the storage unit; and (iii) effectuate a measurement of a weight of the measuring target on the weight measuring unit using the initial value when the initial reference value is not stored in the storage unit and effectuate a measurement of the weight of the measuring target on the weight measuring unit using the initial reference value when stored in the storage unit.

9. A method of measuring a weight of a measuring target using a weight measuring device, the method comprising:

determining whether an initial reference value is stored in a storage unit;

measuring an initial value of an initial state of a weight measuring unit without the measuring target thereon after determining that an initial reference value is not stored in the storage unit;

storing the initial value in the storage unit;

determining whether a predetermined number of initial values having a variation within a predetermined range are stored in the storage unit;

creating an initial reference value after determining that the predetermined number of initial values having the variation within the predetermined range are stored in the storage unit; and measuring the weight of the measuring target using the initial reference value.

10. The method according to claim 9, further comprising:

determining whether an update to the initial reference value is necessary; and deleting the initial reference value from the storage unit after determining that the update is necessary.

11. The method according to claim 9, further comprising:

displaying that the initial reference value was previously stored.

* * * * *